US009525755B2

(12) United States Patent
Pandiarajan et al.

(10) Patent No.: US 9,525,755 B2
(45) Date of Patent: Dec. 20, 2016

(54) PROVIDING CONTENT BASED ON USER BANDWIDTH

(71) Applicant: Verizon Patent and Licensing Inc., Arlington, VA (US)

(72) Inventors: Shunmugapandian Pandiarajan, Chennai (IN); John V. Jayakumar, Chennai (IN)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 142 days.

(21) Appl. No.: 14/226,389

(22) Filed: Mar. 26, 2014

(65) Prior Publication Data

US 2015/0281395 A1    Oct. 1, 2015

(51) Int. Cl.
  G06F 15/16   (2006.01)
  H04L 29/08   (2006.01)
(52) U.S. Cl.
  CPC ............ *H04L 67/32* (2013.01); *H04L 67/16* (2013.01); *H04L 67/18* (2013.01); *H04L 67/322* (2013.01)
(58) Field of Classification Search
  CPC .................................. H04L 67/32; H04L 67/16
  USPC ............ 709/203, 217, 219, 224, 230, 232, 234, 709/235, 246
  See application file for complete search history.

(56) References Cited

U.S. PATENT DOCUMENTS

| | | | |
|---|---|---|---|
| 6,854,013 B2* | 2/2005 | Cable et al. | 709/226 |
| 7,013,351 B2* | 3/2006 | Bracewell et al. | 709/246 |
| 7,437,458 B1* | 10/2008 | Stewart et al. | 709/226 |
| 7,882,260 B2* | 2/2011 | Taylor et al. | 709/236 |
| 2002/0120745 A1* | 8/2002 | Oishi et al. | 709/226 |
| 2002/0170062 A1* | 11/2002 | Chen et al. | 725/86 |
| 2004/0043770 A1* | 3/2004 | Amit et al. | 455/450 |
| 2007/0157173 A1* | 7/2007 | Klein et al. | 717/122 |
| 2007/0198665 A1* | 8/2007 | De Matteis | H04L 41/0843 709/220 |
| 2010/0005504 A1* | 1/2010 | Gottimukkala | H04L 63/20 726/1 |
| 2010/0135637 A1* | 6/2010 | McDermott et al. | 386/75 |
| 2012/0114302 A1* | 5/2012 | Randall | 386/241 |
| 2012/0190386 A1* | 7/2012 | Anderson | 455/456.3 |
| 2014/0068549 A1* | 3/2014 | Friedman et al. | 717/104 |
| 2014/0258469 A1* | 9/2014 | Maharajh et al. | 709/219 |
| 2015/0180956 A1* | 6/2015 | Judd et al. | 707/769 |
| 2015/0281395 A1* | 10/2015 | Pandiarajan et al. | 709/219 |

* cited by examiner

*Primary Examiner* — Michael Y Won

(57) ABSTRACT

A system may be configured to store different versions of a particular item of content, according to a group of content templates; and select a particular content template, of the group of content templates, to use in providing content in response to a request received from a user device. The particular content template may be selected based on bandwidth information regarding the user device. The bandwidth information may indicate a level of service to which a subscriber, associated with the user device, has subscribed. The bandwidth information may be based on a signal strength to a user device in a particular location.

20 Claims, 10 Drawing Sheets

400 →
| User Device ID | Subscribed bandwidth |
|---|---|
| User_Device_A | 15 Mbps |
| User_Device_B | 30 Mbps |
| User_Device_C | 1.5 Mbps |
FIG. 4
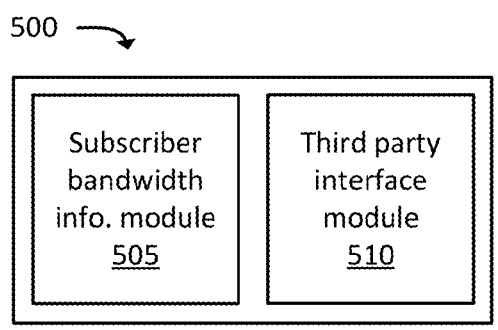
FIG. 5
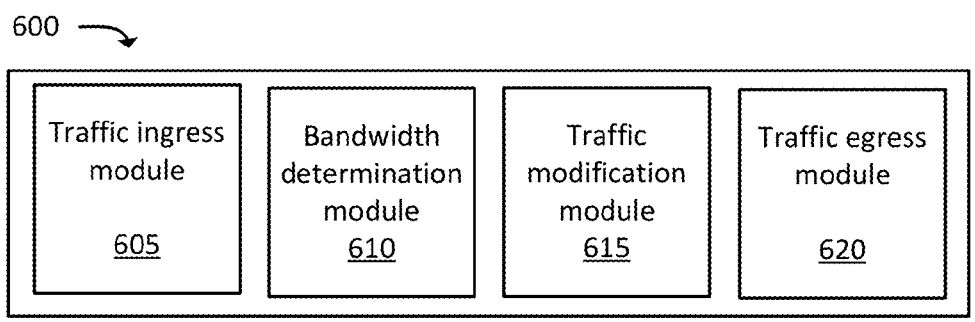
FIG. 6

PROVIDING CONTENT BASED ON USER BANDWIDTH

BACKGROUND

Networks, such as the Internet, allow users to access content (e.g., web pages). Some content may be relatively high-fidelity content, such as high resolution (e.g., high definition, or "HD") video content. In some situations, content (such as high-fidelity content) may consume a relatively large amount of bandwidth, relative to the bandwidth available to a particular user. In these situations, the content may be provided in an undesirable manner, which may degrade the user's experience. For instance, the user may experience a relatively long load time for the content, the user may experience pauses or other playback issues associated with the content, etc.

BRIEF DESCRIPTION OF THE DRAWINGS

FIG. 4 illustrates an example data structure that may be stored by a bandwidth information repository;

FIG. 5 illustrates example functional components of a bandwidth information repository;

FIG. 6 illustrates example functional components of a bandwidth information provider;

DETAILED DESCRIPTION OF PREFERRED EMBODIMENTS

The following detailed description refers to the accompanying drawings. The same reference numbers in different drawings may identify the same or similar elements.

Figure 1:
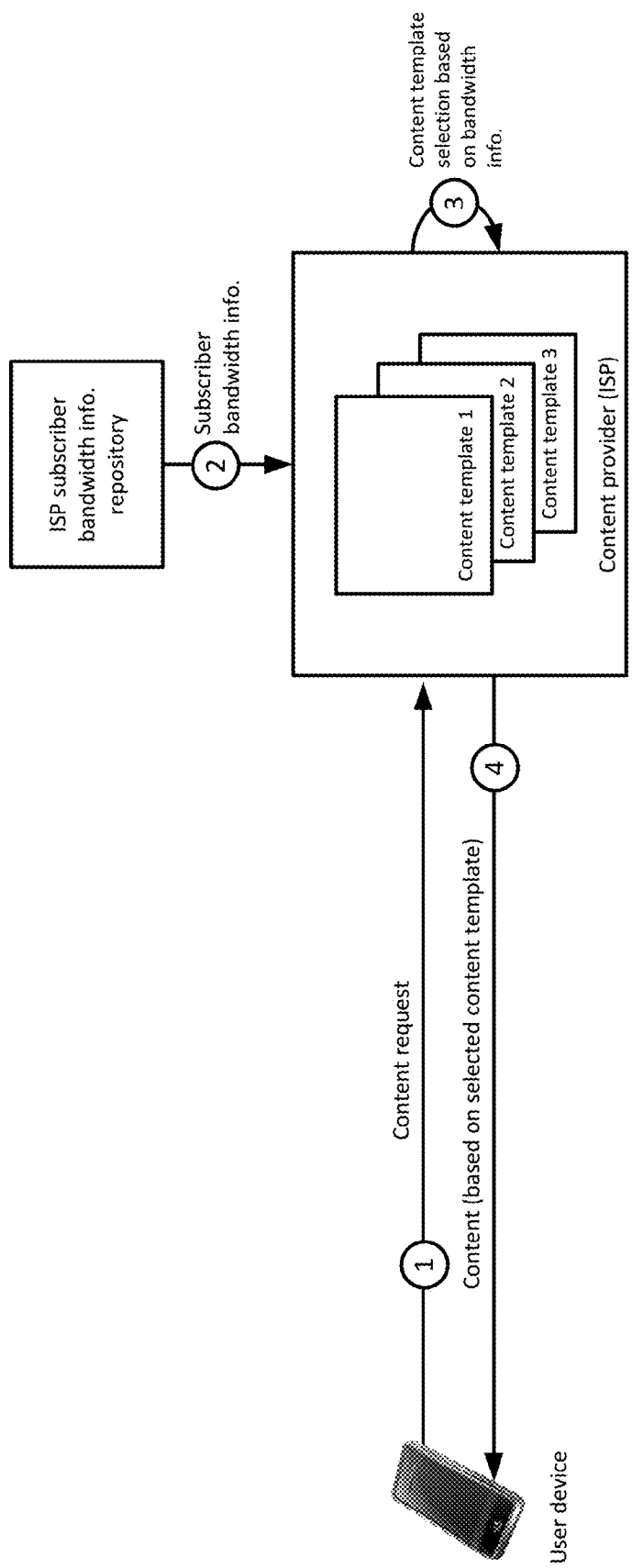
FIGS. 1 and 2 illustrate overviews of one or more example implementations described herein.

Techniques described herein may allow a content provider to provide content (e.g., web content) in a manner that is based on the bandwidth capabilities of a requester of the content. For example, as shown in FIG. 1, an Internet service provider ("ISP") may be associated with a content provider that stores content, which may be provided to a user device (e.g., a user device that receives Internet connectivity services from the ISP). As shown, a particular item of content (e.g., a web page, a video, etc.) may be associated with multiple different content templates (e.g., Content template 1, Content template 2, and Content template 3).

The different content templates may correspond to different levels of fidelity, and may accordingly consume different amounts of bandwidth when being provided to the user device. The content provider may, thus, store different versions of content, according to the different content templates. For example, Content template 1 may correspond to a relatively low-resolution version of a video (e.g., 480p), Content template 2 may correspond to a relatively high-resolution version of a video (e.g., 1080p), and Content template 3 may correspond to a video with a resolution between that of Content templates 1 and 2 (e.g., 720p). Additionally, or alternatively, the different content templates may correspond to different coder-decoders ("codecs") and/or compression techniques. The ISP content provider may also store information indicating bandwidths, or ranges of bandwidths, that correspond to the different content templates. For instance, Content template 1 may correspond to a bandwidth of greater than 5.0 Megabits per second ("Mbps"), Content template 2 may correspond to a bandwidth of less than 0.5 Mbps, and Content template 3 may correspond to a bandwidth greater than 0.5 Mbps and less than 5.0 Mbps.

The ISP may also be associated with a subscriber bandwidth information repository, which may store information regarding a bandwidth, to which a subscriber associated with the user device, is subscribed. For instance, the ISP may offer different levels of service (e.g., different maximum and/or minimum downlink bandwidths), and the ISP subscriber bandwidth information repository may store information indicating with which particular level of service the user device is associated.

As shown in FIG. 1, the user device may output (at arrow "1") a request for content ("Content request"). The request may include, for example, a Uniform Resource Locator ("URL") that identifies the desired content. Assume, for instance, that the URL identifies content that is associated with the ISP content provider, and to which Content templates 1-3 correspond. The ISP content provider may receive (at arrow "2") information indicating a level of service (e.g., subscribed bandwidth) associated with the user device.

As further shown, the ISP content provider may select (at arrow "3") a particular content template, based on the received subscriber bandwidth information. As described below, the ISP content provider may make this selection based on additional information (e.g., actual measured bandwidth capability information, information indicating a type of network to which the user device is connected, etc.) in addition to, or in lieu of, the subscriber bandwidth information. For example, the ISP content provider may select one of Content templates 1-3, based on the bandwidth information received from the ISP subscriber bandwidth information repository. The ISP content provider may provide (at arrow "4") content, based on the selected content template, to the user device. For example, if Content template 2 is selected for a particular video stream, the video stream may be provided to the user device at a video resolution indicated by Content template 2.

Figure 2:
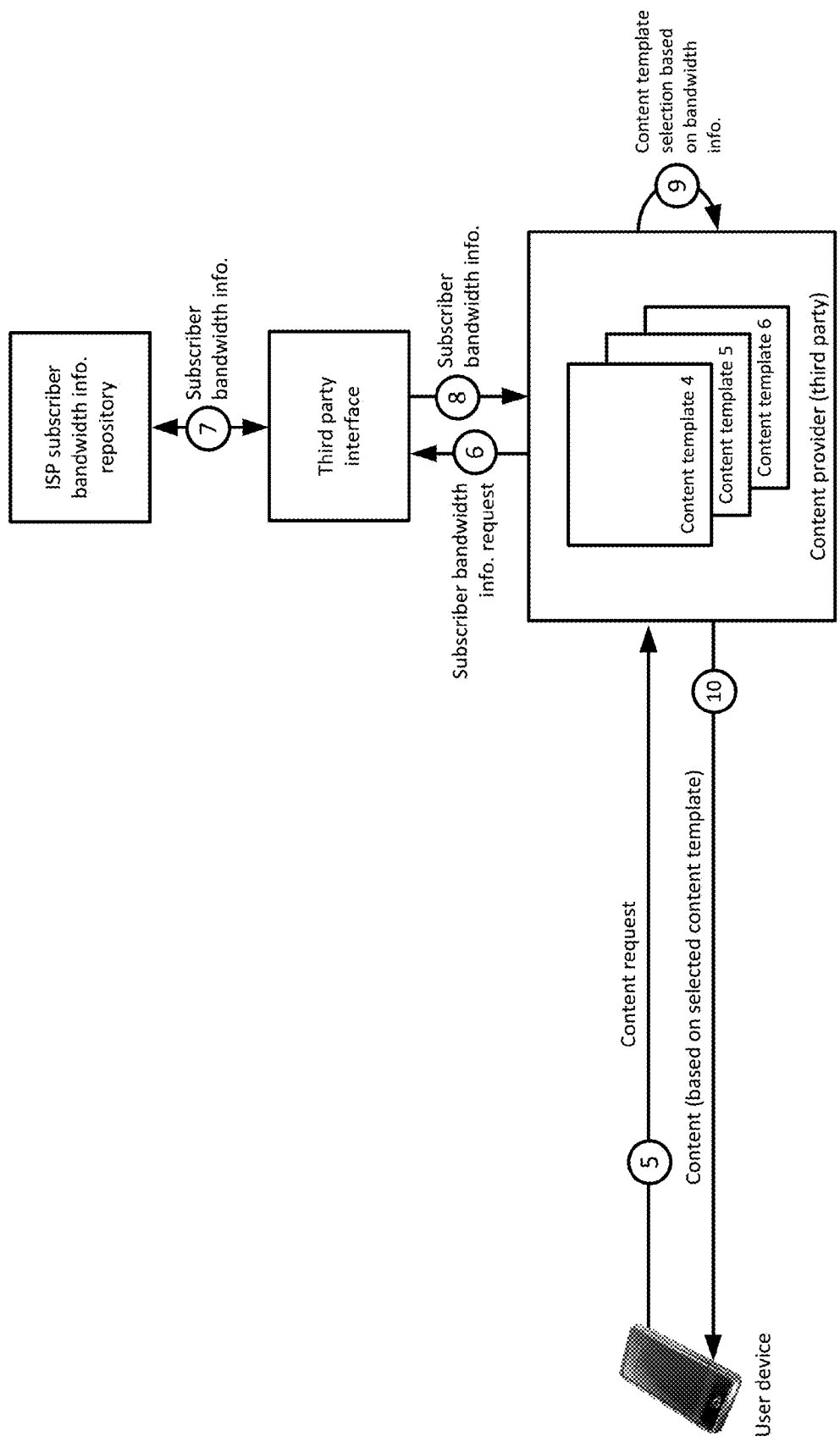

As shown in FIG. 2, similar techniques may be available for a third party content provider (e.g., a content provider that is not associated with an ISP that provides Internet connectivity to a user device). In some such implementations, a third party interface may be provided by the ISP, via which the third party content provider may receive subscriber bandwidth information.

For instance, as shown, the user device may request (at arrow "5") content from the third party content provider. The third party content provider may request (at arrow "6") information regarding subscriber bandwidth, associated with the user device, from the third party interface. The third party interface may obtain (at arrow "7") the requested bandwidth information, and may provide (at arrow "8") the information to the third party content provider. The third party content provider may select (at arrow "9") a particular content template, based on the bandwidth information, and may output (at arrow "10") content, according to the selected content template, to the user device.

Providing a content, according to a content template selected based on the bandwidth capabilities of a user device (e.g., based on the subscribed bandwidth associated with the user device), may improve a user's experience. For example, content templates that do not require excessive download times and/or buffering times may be selected for user devices that have relatively lower bandwidth capabilities, while content templates that include higher fidelity content may be selected for user devices that have relatively higher bandwidth capabilities.

Figure 3:
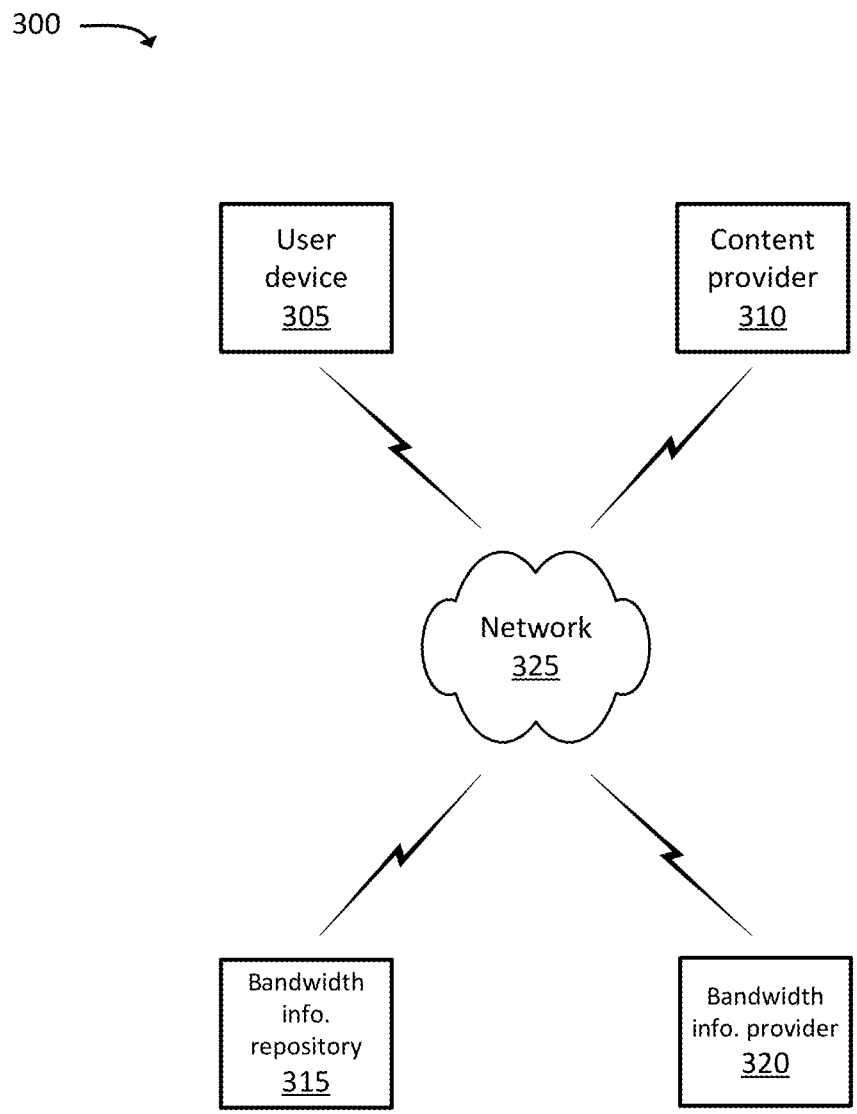
FIG. 3 illustrates an example environment in which systems and/or methods, described herein, may be implemented.

FIG. 3 illustrates an example environment 300, in which systems and/or methods described herein may be implemented. As shown in FIG. 3, environment 300 may include user device 305, content provider 310, bandwidth information repository 315, bandwidth information provider 320, and network 325.

The quantity of devices and/or networks, illustrated in FIG. 3, is provided for explanatory purposes only. In practice, environment 300 may include additional devices and/or networks; fewer devices and/or networks; different devices and/or networks; or differently arranged devices and/or networks than illustrated in FIG. 3. Alternatively, or additionally, one or more of the devices of environment 300 may perform one or more functions described as being performed by another one or more of the devices of environments 300. Devices of environment 300 may interconnect with each other and/or other devices via wired connections, wireless connections, or a combination of wired and wireless connections.

User device 305 may include any computation and communication device, such as a wireless mobile communication device that is capable of communicating with one or more networks (e.g., network 325). For example, user device 305 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a set-top device ("STD"), a personal gaming system, a wearable device, and/or another type of mobile computation and communication device. User device 305 may receive connectivity to content provider 310 and/or to network 325 via services provided by a service provider, such as an ISP. An ISP may, in some implementations, be a wireless telecommunications provider (e.g., a cellular telecommunications provider).

Content provider 310 may include a server device, or a collection of server devices, that store and/or provide content, such as web content, to user device 305. Content provider 310 may, for instance, include a web server that provides stored content in response to Hypertext Transfer Protocol ("HTTP") requests for the content. According to some implementations, content provider 310 may store multiple "templates" for content. These templates may correspond to different versions of content (e.g., the same content encoded using a different codec, compression technique, or the like). As described below, when receiving a request for content, content provider 310 may select a particular template of the requested content, and may provide content associated with the selected content template. In some implementations, content provider 310 may use information provided by bandwidth information repository 315 and/or bandwidth information provider 320 when making the selection. Generally, content provider 310 may select a template based on a bandwidth subscribed to by a user of user device 305, measured bandwidth capabilities of user device 305, an identified location of user device 305, and/or other factors, as described below.

In some implementations, content provider 310 may be owned and/or operated by an ISP, with which user device 305 is associated (e.g., an ISP that provides Internet connectivity and/or connectivity to network 325). Content provider 310 may, in some implementations, receive and/or store identifying information for user devices 305 that are associated with the particular ISP (e.g., that subscribe to services provided by the particular ISP), in order to identify whether incoming requests for content are from user devices 305 associated with the particular ISP or a different ISP. In some implementations, content provider 310 may be owned and/or operated by a third party (e.g., by an entity other than an ISP with which user device 305 is associated).

In some implementations, content provider 310 may be, and/or may include, a content delivery network ("CDN"), which may include one or more server devices that cache and provide content to user devices 305. In some implementations, multiple CDNs may be located at different "edges" of networks, and may be selected based on a location of a device that requests content (e.g., user device 305).

Bandwidth information repository 315 may include a server device, or a collection of server devices, that store information regarding a level of service (e.g., a bandwidth, a measure of Quality of Service ("QoS"), or the like) associated with user devices associated with a particular ISP, such as user device 305. As described below, the bandwidth information, stored by content provider 310, may include information regarding a bandwidth to which a particular subscriber is subscribed. In some implementations, content provider 310 may be associated with a different owner and/or operator than bandwidth information repository 315. In some such implementations, and as described below, bandwidth information repository 315 may include a third party interface, via which content provider 310 may obtain information stored by bandwidth information repository 315. In some implementations, environment 300 may include multiple bandwidth information repositories 315, each bandwidth information repository 315 corresponding to a different ISP.

Bandwidth information provider 320 may include one or more devices (e.g., server devices, router devices, and/or other devices) that provide additional bandwidth information to content provider 310. For instance, as described below, bandwidth information provider 320 may include one or more network devices (e.g., router devices) within network 325. In some implementations, bandwidth information provider 320 may include one or more server devices accessible via network 325. Bandwidth information provider 320 may, in some implementations, receive subscriber bandwidth information from bandwidth information repository 315. Bandwidth information provider 320 may additionally, or alternatively, receive other bandwidth information (e.g., actual measured bandwidth information) from one or more other sources. Bandwidth information provider 320 may, in some implementations, modify traffic, received from user device 305, to include information regarding the subscriber bandwidth and/or other bandwidth information. Bandwidth information provider 320 may provide the modified traffic to content provider 310, which may select a content template based on the information provided by bandwidth information provider 320.

Network 325 may include one or more networks, via which user device 305, content provider 310, bandwidth information repository 315, and/or bandwidth information provider 320 may communicate. For example, network 325 may include an evolved packet system ("EPS") that includes a Long Term Evolution ("LTE") network and/or an evolved packet core ("EPC") network that operate based on a third generation partnership project ("3GPP") wireless communication standard. The LTE network may be, or may include, a radio access network ("RAN") that includes one or more base stations, some or all of which may take the form of an eNodeB ("eNB"), via which user device 305 and/or another device may communicate with the EPC network. The EPC network may include one or more serving gateways ("SGWs"), mobility management entities ("MMEs"), and/or packet data network ("PDN") gateways ("PGWs"), and may enable user device 305 to communicate with a PDN (e.g., the Internet) and/or an IP Multimedia Subsystem ("IMS") core network. The IMS core network may manage authentication, session initiation, account information, a user profile, etc. associated with user device 305.

Network 325 may additionally, or alternatively, include a wide area network ("WAN"), a metropolitan area network ("MAN"), the Internet, a fiber optic-based network, and/or a combination of these or other types of networks. Network 325 may include one or more wireless networks in addition to, or in lieu of, an LTE network. For example, network 325 may include a Code Division Multiple Access ("CDMA") 2000 1× network, a second generation ("2G") wireless network, a third generation ("3G") wireless network, a fourth generation ("4G") wireless network, a fifth generation ("5G") wireless network, a "Wi-Fi" wireless network (e.g., a network that operates according to an Institute of Electrical and Electronics Engineers ("IEEE") 802.11 standard), and/or another wireless network. In some implementations, network 325 may be communicatively coupled to one or more other networks.

FIG. 4 illustrates an example data structure 400, which may be stored by bandwidth information repository 315 in some implementations. As shown, data structure 400 may be used to store information that correlates user devices 305 to bandwidths subscribed to by subscribers associated with the user devices 305. While shown as a table, data structure 400 may, in practice, take the form of another data structure, such as a linked list, an array, tree, and/or any other suitable data structure. Further, while specific types of information are shown in FIG. 4, in practice, data structure 400 may include additional, fewer, different, and/or differently arranged information.

As shown, data structure 400 may include information regarding a set of user devices 305, such as a user device identifier ("ID") and a bandwidth associated with a user of user devices 305 ("Subscribed bandwidth"). The user device identifier field, for a particular user device 305, may include an International Mobile Subscriber Identity ("IMSI") value, an International Mobile Station Equipment Identity ("IMEI") value, a serial number, and/or another value that uniquely identifies user device 305. The subscribed bandwidth field, for a particular user device 305, may indicate a bandwidth (e.g., a maximum downlink bandwidth, a minimum downlink bandwidth, etc.) to which a subscriber, associated with user device 305, is subscribed. The information stored in data structure 400 may be received from a service provider, such as an ISP and/or a wireless telecommunications provider, associated with user device 305 and/or with bandwidth information repository 315. For instance, the information may be provided when the subscriber initially signs up for service with the service provider, and/or when terms of service are changed (e.g., in the event that the subscribed bandwidth is changed).

FIG. 5 illustrates example functional components of bandwidth information repository 500, in accordance with some implementations. Bandwidth information repository 500 may, in some implementations, correspond to bandwidth information repository 315. For instance, bandwidth information repository 500 may correspond to a particular bandwidth information repository 315 that is owned and/or operated by a service provider that is a different entity from an owner and/or operator of content provider 310.

As shown, bandwidth information repository 500 may include subscriber bandwidth information module 505 and third party interface 510. In other implementations, bandwidth information repository 500 may include additional, fewer, different, or differently arranged components. In some implementations, the functionality described below with regard to one component may be performed in whole or in part by one or more other components.

Subscriber bandwidth information module 505 may store information regarding levels of service (e.g., bandwidth) subscribed to by a set of subscribers. In some implementations, the information, stored by subscriber bandwidth information module 505, may correspond to example data structure 400, described above with respect to FIG. 4. Third party interface 510 may allow third party devices, such as content providers 310 that are owned and/or operated by a different service provider that owns and/or operates bandwidth information repository 315, to access information stored by bandwidth information repository 315 (e.g., information stored by subscriber bandwidth information module 505). Third party interface 510 may, for example, authenticate third party content providers 320, to verify that such content providers 320 are authorized to access the information stored by bandwidth information repository 315. In some implementations, third party interface 510 may receive a request (from a third party content provider 310) for information regarding a particular user device 305, access subscriber bandwidth information module 505 to retrieve subscriber bandwidth information associated with the particular user device 305, and provide the requested subscriber bandwidth information to the third party content provider 310.

FIG. 6 illustrates example functional components of bandwidth information provider 600, in accordance with some implementations. Some or all of bandwidth information provider 600 may, in some implementations, correspond to bandwidth information provider 320. Additionally, or alternatively, in some implementations, bandwidth information provider 600 may include a device, such as a network device, that receives traffic (e.g., requests for content) from user device 305 and forwards the traffic toward content provider 310.

As shown, bandwidth information provider 600 may include traffic ingress module 605, bandwidth determination module 610, traffic modification module 615, and traffic egress module 620. In other implementations, bandwidth information provider 600 may include additional, fewer, different, or differently arranged components. For example, in some implementations, bandwidth information provider 600 may not include traffic ingress module 605, traffic modification module 615, or traffic egress module 620. In some of these implementations, bandwidth information provider 600 may correspond to bandwidth information provider 320, which may receive and respond to requests for bandwidth information regarding a particular user device 305.

Traffic ingress module 605 may receive traffic from user device 305. The traffic may include requests for content, such as video content, audio content, etc. In some implementations, the requests may be in the form of Internet Protocol ("IP") packets that include HTTP "GET" requests, HTTP "POST" requests, and/or other types of requests according to Transmission Control Protocol ("TCP"), IP, User Datagram Protocol ("UDP"), and/or other protocols.

Bandwidth determination module 610 may determine subscriber bandwidth information associated with user device 305 (e.g., user device 305 from which the traffic was received by traffic ingress module 605, and/or another user device, such as a user device 305 specified in a bandwidth information request from content provider 310). For example, bandwidth determination module 610 may identify user device 305 based on information provided in a header (e.g., an IP header) of the traffic. As another example, a request may be received, from content provider 310, for bandwidth information regarding user device 305. The request from content provider 310 may include information identifying user device 305, which may be used by bandwidth determination module 610 to identify subscriber bandwidth information regarding user device 305.

The identifying information, regarding user device 305, may include an IP address, an IMEI value, a media access control ("MAC") address, an equipment type identifier, and/or another identifier associated with user device 305. Bandwidth determination module 610 may determine whether user device 305 is associated with a service provider, with which bandwidth information provider 600 is also associated. For example, bandwidth determination module 610 may store and/or receive information (e.g., a list) that identifies user devices 305 that are associated with the service provider. Assuming that user device 305 and bandwidth information provider 600 are associated with the same service provider, bandwidth determination module 610 may request subscriber bandwidth information, associated with user device 305, from a particular bandwidth information repository 315 that is associated with the service provider.

Bandwidth determination module 610 may, in some implementations, perform a WHOIS query, based on the IP address of user device 305, to identify a service provider associated with user device 305. For instance, bandwidth determination module 610 may perform such a query when user device 305 and bandwidth information provider 600 do not store and/or receive information indicating that user device 305 and bandwidth information provider 600 are associated with the same service provider. Bandwidth determination module 610 may request subscriber bandwidth information, associated with user device 305, from a particular bandwidth information repository 315 that is associated with the identified service provider. For example, in some implementations, the request for subscriber bandwidth information may be transmitted, by bandwidth determination module 610, to third party interface 510, and may include an identifier of user device 305 (e.g., the IMEI value and/or other identifying information determined from the header).

In some implementations, bandwidth determination module 610 may determine, and/or may receive from another source, additional bandwidth information regarding user device 305. For instance, bandwidth determination module 610 may receive information regarding a measured bandwidth of which user device 305 is capable of receiving, processing, presenting, or rendering. The measured bandwidth may be a result of, for example, a download speed test performed by, or on behalf of, user device 305.

In some implementations, bandwidth determination module 610 may receive information indicating a network (e.g., a RAN), via which user device 305 is currently in communication with. For instance, bandwidth determination module 610 may receive information (e.g., from user device 305 and/or from another source) that user device 305 is presently connected to a network that provides lower bandwidth than a subscribed bandwidth associated with user device 305.

In some implementations, bandwidth determination module 610 may receive geo-location information associated with user device 305. Bandwidth determination module 610 may, in some implementations, determine that user device 305 is in a location associated with bandwidth that is lower than a subscribed bandwidth associated with user device 305. For instance, such a location may be a building with high wireless interference, a tunnel, a mountain, or the like. As another example, another such location may be a location associated with a particular network, such as a public wireless "hotspot," which may provide bandwidth that is lower than a subscribed bandwidth associated with user device 305. In order to make this determination, bandwidth determination module 610 may store and/or receive information indicating locations that may be associated with interference and/or other factors that may have an effect on bandwidth.

Traffic modification module 615 may modify traffic based on information determined by bandwidth determination module 610. For example, traffic modification module 615 may modify a header of traffic received via traffic ingress module 605, add header information to the traffic, and/or add information to a payload of traffic ingress module 605. The modified traffic (e.g., additional header information) may indicate, for example, a subscribed bandwidth associated with user device 305, additional bandwidth information associated with user device 305, geo-location information associated with user device 305, and/or other information regarding user device 305. As mentioned above, content provider 310 may use the additional information, in the modified traffic, to select a content template in response to a content request from user device 305.

Traffic egress module 620 may output (e.g., forward) the modified traffic (e.g., toward an indicated destination of the traffic, such as content provider 310). In implementations where bandwidth information provider 600 does not modify traffic (e.g., implementations in which bandwidth information provider 600 does not include traffic ingress module 605, traffic modification module 615, and/or traffic egress module 620), bandwidth determination module 610 may output the bandwidth information to a requester of the information (e.g., content provider 310).

Figure 7:
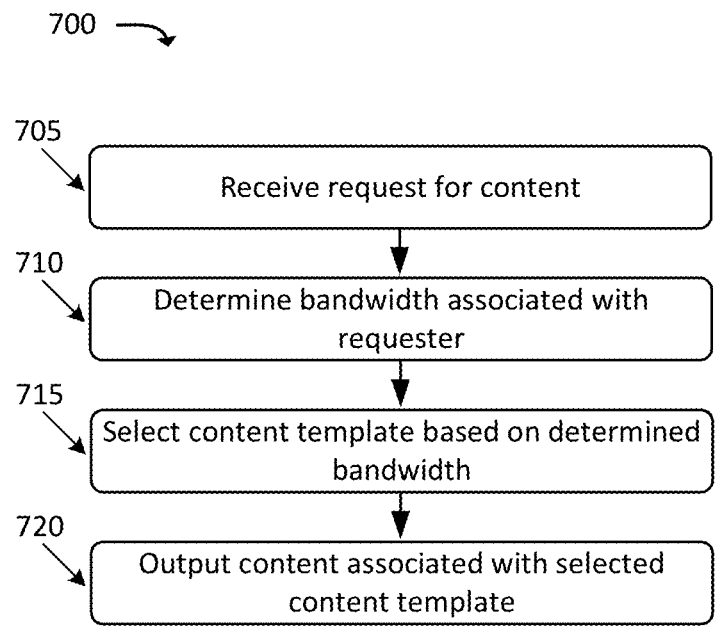
FIG. 7 illustrates an example process for outputting a content, according to a content template selected based on a bandwidth associated with a user device.

FIG. 7 illustrates an example process 700 for outputting content, according to a content template selected based on a bandwidth associated with a user device. In one example implementation, process 700 may be performed by content provider 310. In other implementations, some or all of process 700 may be performed by one or more other devices in addition to, or in lieu of, content provider 310.

Process 700 may include receiving (at 705) a request for content. For example, content provider 310 may receive a request for content (e.g., an HTTP "GET" request for a web page) from user device 305. The request for content may, for instance, include a location identifier (such as a URL) that indicates a resource that can provide the particular item of content. The request may also include information (e.g., header information) identifying a requester of the content (e.g., an IP address of user device 305, an IMEI value associated with user device 305, etc.). The request may also, in some implementations, include header information and/or other information that indicates bandwidth information associated with user device 305 (e.g., subscribed bandwidth, measured bandwidth, etc.).

Process 700 may also include determining (at 710) a bandwidth associated with the requester of the content. For instance, content provider 310 may identify header information and/or other information, as discussed above, that indicates a subscribed bandwidth associated with user device 305, an actual bandwidth associated with user device 305, etc. Additionally, or alternatively, content provider 310 may request bandwidth information, regarding, user device 305, from bandwidth information repository 315 and/or bandwidth information provider 320. For example, as discussed above, in situations where content provider 310, bandwidth information repository 315, and/or bandwidth information provider 320 are associated with the same service provider, content provider 310 may obtain the bandwidth information without the use of a third party interface (e.g., third party interface 510). For example, as described above, content provider 310 may request bandwidth information from bandwidth information provider 320, which may determine that user device 305 and bandwidth information provider 320 are associated with the same service provider. Based on this determination, bandwidth information provider 320 may obtain subscriber bandwidth information from bandwidth information repository 315 without the use of a third party interface.

In situations where content provider 310, bandwidth information repository 315, and/or bandwidth information provider 320 are not associated with the same service provider, content provider 310 may request bandwidth information from bandwidth information provider 320, which may perform a WHOIS lookup to determine a service provider associated with user device 305. Based on the determined service provider, bandwidth information provider 320 may request subscriber bandwidth information from an associated bandwidth information repository 315, and provide the subscriber bandwidth information to content provider 310.

Figure 8:
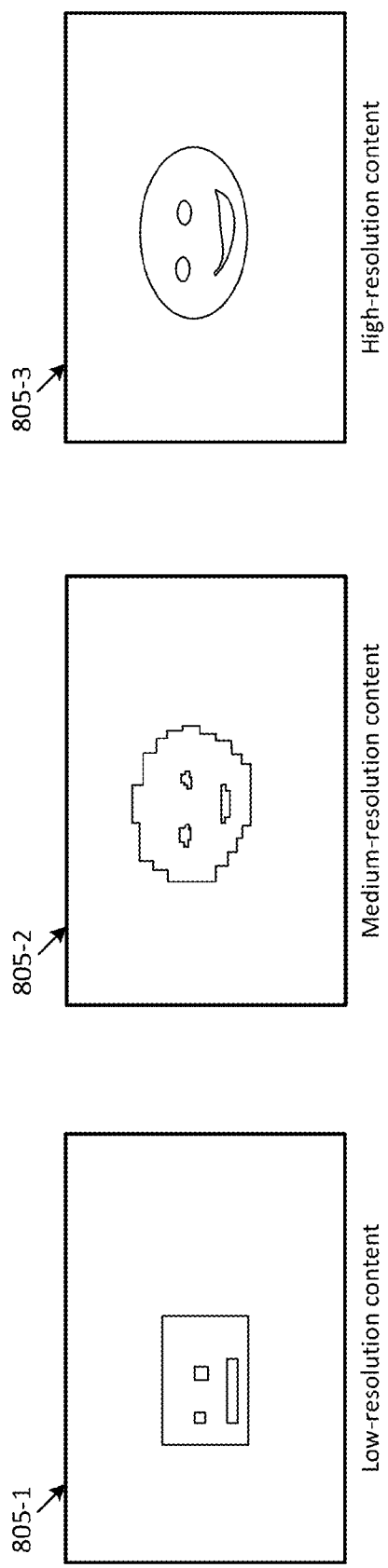
FIG. 8 illustrates different example content, according to content templates that are associated with different bandwidths.

Process 700 may further include selecting (at 715) a content template based on the determined bandwidth. For example, as mentioned above, content provider 310 may store a set of content templates that each correspond to different versions of the same item of content. FIG. 8 illustrates three example versions of content 805-1 through 805-3 (sometimes referred to herein individually as "content item 805," or collectively as "content items 805"), which may be stored by content provider 310. Each content item 805 may correspond to different content templates. For example, a single URL may be used, by a device external to content provider 310, to request content, and content provider 310 may select a version of content item 805 (e.g., based on a selected content template) to provide in response to the request, based on the bandwidth information received at 710.

For instance, content item 805-1 may be referred to as "low-resolution content" (e.g., associated with a "low-resolution content template"), content item 805-2 may be referred to as "medium-resolution content" (e.g., associated with a "medium-resolution content template"), and content item 805-3 may be referred to as "high-resolution content" (e.g., associated with a "high-resolution content template"). Accordingly, content provider 310 may store information indicating threshold bandwidths (e.g., subscribed bandwidths, measured bandwidths, and/or some other technique that is based on a combination subscribed bandwidth, measured bandwidth, and/or another bandwidth metric) for each content template with which content items 805 are associated. For instance, content provider 310 may store information indicating that the low-resolution content template should be selected for user devices 305 with a bandwidth of less than 0.5 Mbps, the medium-resolution content template should be provided for user devices 305 with a bandwidth of greater than 0.5 Mbps and less than 5.0 Mbps, and that the high-resolution content template should be provided for user devices 305 with a bandwidth of greater than 5.0 Mbps.

In some implementations, different items of content may be associated with different content templates, which may each be associated with different bandwidth thresholds. That is, content provider 310 may store a different quantity of versions of content for different items of content. For example, one item of content may be associated with one single content template, while another item of content may be associated with three content templates (each having a different one of three sets of associated bandwidth levels), while yet another item of content may be associated with five (or more) content templates (each having a different one of five sets of associated bandwidth levels).

Returning to FIG. 7, process 700 may additionally include outputting (at 720) content associated with the selected content template. For example, content provider 310 may output content, based on the content template that was selected based on the determined bandwidth, to the requester of the content (e.g., user device 305). In some implementations, when content, associated with the selected content template, is unavailable, content provider 310 may attempt to select content that consumes less bandwidth than the selected content template. For instance, if a medium-resolution content template is selected (at 715), but content provider 310 does not store medium-resolution content, content provider 310 may attempt to locate low-resolution content for outputting.

Figure 9:
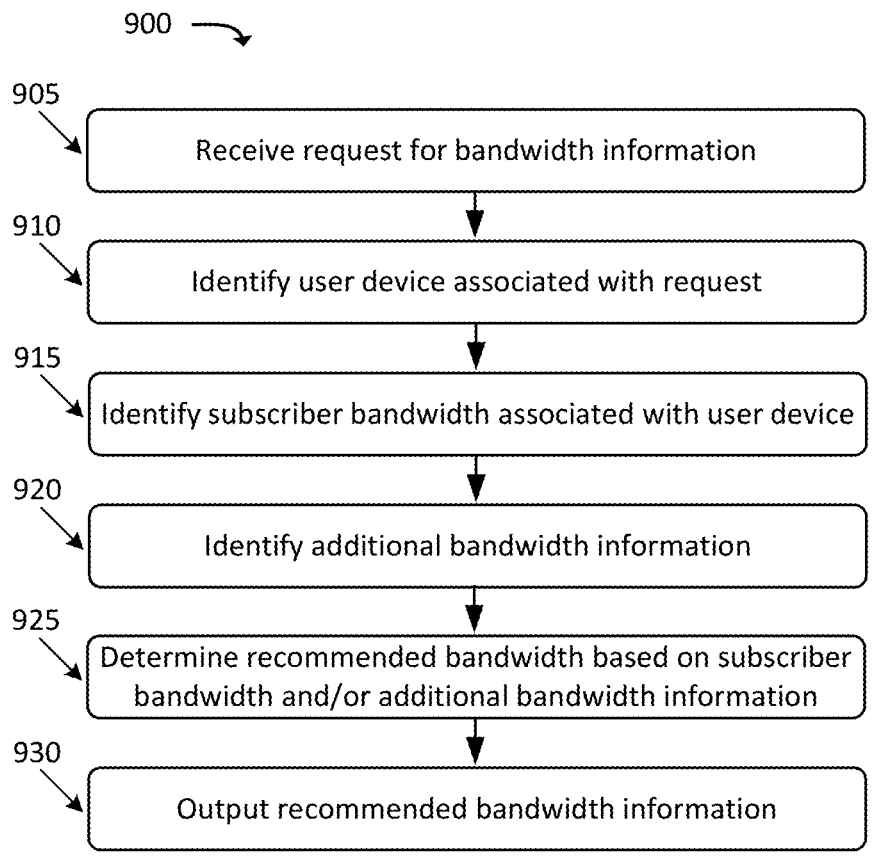
FIG. 9 illustrates an example process for outputting bandwidth information, associated with a user device.

FIG. 9 illustrates an example process 900 for outputting bandwidth information, associated with a user device. In one example implementation, process 900 may be performed by bandwidth information provider 320. In other implementations, some or all of process 900 may be performed by one or more other devices in addition to, or in lieu of, bandwidth information provider 320.

Process 900 may include receiving (at 905) a request for bandwidth information. For example, bandwidth information provider 320 may receive a request for bandwidth information from a particular content provider 310, such as when content provider 310 receives a request for content. In some implementations, the request for bandwidth information may include information identifying a particular user device 305 (e.g., a user device from which a request for content was received by content provider 310), such as an IP address, an IMEI value, or the like.

Process 900 may also include identifying (at 910) a user device associated with the request. For example, bandwidth information provider 320 may identify user device 305 based on the identifying information in the request for bandwidth information. Bandwidth information provider 320 may additionally, in some implementations, determine a service provider associated with user device 305 and/or content provider 310.

Process 900 may additionally include identifying (at 915) a subscriber bandwidth associated with the user device. For example, bandwidth information provider 320 may request subscriber bandwidth information from bandwidth information repository 315. In some implementations, if user device 305, bandwidth information repository 315, and/or bandwidth information provider 320 are not associated with the same service provider, bandwidth information provider 320 may make the request, for subscriber bandwidth information, via a third party interface associated with bandwidth information repository 315 (e.g., as described above with respect to third party interface 510).

Process 900 may further include identifying (at 920) additional bandwidth information. For example, bandwidth information provider 320 may request and/or receive additional bandwidth information from user device 305 and/or another source. As described above, the additional bandwidth information may indicate, for example, a measured bandwidth associated with user device 305, an identification of a network (or type of network) to which user device 305 is connected, an indication of a geographical location associated with user device 305, etc. In some implementations, the additional bandwidth information may be useful, in situations where user device 305 is capable of lower bandwidth than an actual subscribed bandwidth. For instance, such a situation may arise when user device 305 is located in an area with low signal-to-noise ratio of wireless signals used to communicate with network 325, when user device 305 is sharing a connection with another device that is using a large amount of the subscribed bandwidth, etc.

Process 900 may also include determining (at 925) a recommended bandwidth based on the subscriber bandwidth and/or the additional bandwidth information. For instance, bandwidth information provider 320 may select, as the recommended bandwidth, the lower of the subscribed bandwidth and/or a bandwidth indicated in the additional bandwidth information. For instance, assume that the subscribed bandwidth is 30 Mbps, and the additional bandwidth information indicates that an actual measured bandwidth, associated with user device 305, is 10 Mbps. In this situation, bandwidth information provider 320 may determine that the recommended bandwidth for user device 305 is 10 Mbps.

In some implementations, bandwidth information provider 320 may disregard additional bandwidth information (and/or may not receive or identify (at 920) additional bandwidth information. In accordance with some of these implementations, and referring back to the example described immediately above, bandwidth information provider 320 may determine that the recommended bandwidth is 30 Mbps (i.e., the subscribed bandwidth).

In some implementations, bandwidth information provider 320 may use a weighting factor for the subscribed bandwidth and/or the additional bandwidth to determine the recommended bandwidth. For example, in some implementations, bandwidth information provider 320 may average the subscribed bandwidth and one or more additional metrics of bandwidth information (e.g., use the same weighting factor for each item of bandwidth information). In some implementations, bandwidth information provider 320 may use different weighting factors (e.g., may weight measured bandwidth more heavily than the subscribed bandwidth). In accordance with some of these implementations, and referring back to the example described immediately above, bandwidth information provider 320 may determine that the recommended bandwidth is 20 Mbps (e.g., based on different weighting factors applied to the subscribed bandwidth and the additional bandwidth information).

Process 900 may additionally include outputting (at 930) the recommended bandwidth information. For example, bandwidth information provider 320 may output the recommended bandwidth information to the requester of the information, such as content provider 310. Content provider 310 may use the recommended bandwidth information to select a content template in response to a request for content from user device 305, as described above.

Figure 10:
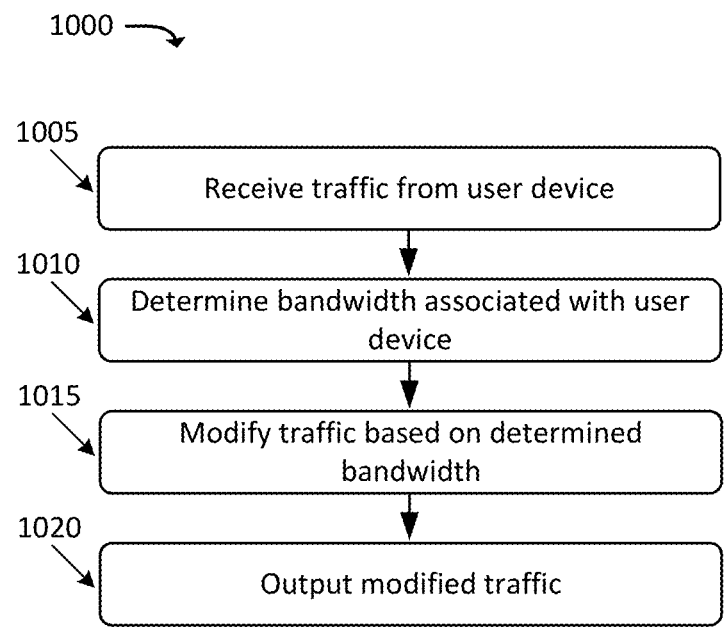
FIG. 10 illustrates an example process for modifying traffic, from a user device, based on a bandwidth associated with the user device.

FIG. 10 illustrates an example process 1000 for modifying traffic, from a user device, based on a bandwidth associated with the user device. In one example implementation, process 1000 may be performed by bandwidth information provider 600 (e.g., by some or all of modules 605-620, as described above with respect to FIG. 6). For example, as mentioned above, bandwidth information provider 600 may include bandwidth information provider 320, and/or a router and/or another network device (e.g., a device within, or communicatively coupled to, network 325) that receives traffic from user device 305, and forwards the traffic toward content provider 310.

Process 1000 may include receiving (at 1005) traffic from a user device. For example, as described above with respect to traffic ingress module 605, bandwidth information provider 600 may receive traffic from user device 305, which may include a request for content stored by content provider 310.

Process 1000 may also include determining (at 1010) bandwidth associated with the user device. For example, as described above with respect to bandwidth determination module 610, bandwidth information provider 600 may determine a bandwidth (e.g., a recommended bandwidth, which may be determined in a similar manner as described with respect to process 900).

Figure 11:
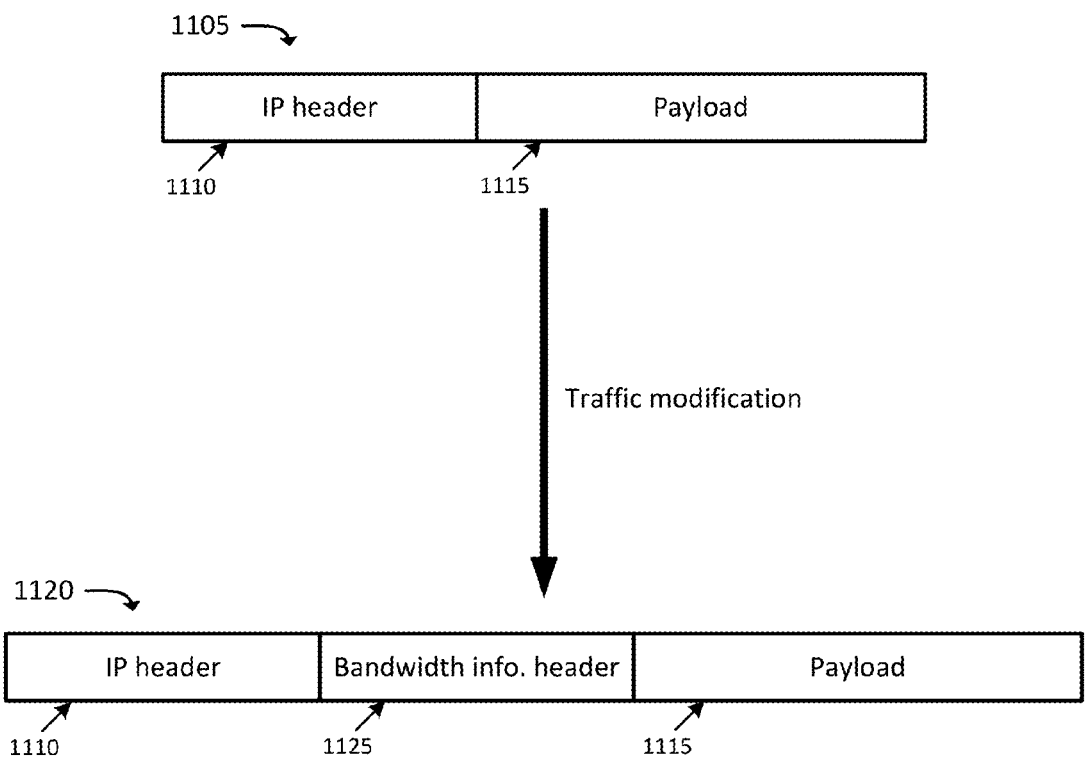
FIG. 11 illustrates an example of traffic, modified to include bandwidth information.

Process 1000 may further include modifying (at 1015) traffic based on the determined bandwidth. For instance, as described above with respect to traffic modification module 615, bandwidth information provider 600 may modify the traffic to include the bandwidth information (determined at 1010). FIG. 11 conceptually illustrates an example of traffic, modified to include bandwidth information.

For example, as shown in FIG. 11, traffic 1105 may correspond to traffic received at 1005. In some implementations, received traffic may include packet 1105. In some implementations, packet 1105 may be modified based on including a request for content, while packet 1105 may, in some implementations, be modified independent of whether packet 1105 includes a request for content. For instance, packet 1105 may include an initial communication from user device 305 to content provider 310. In some implementations, bandwidth information provider 600 may modify traffic on a periodic or intermittent basis. For example, bandwidth information provider 600 may modify every tenth packet, every one thousandth packet, etc. from user device 305 to bandwidth information provider 600. In some implementations, bandwidth information provider 600 may modify one packet every minute, every hour, etc., from user device 305. In some implementations, in lieu of modifying traffic from user device 305, bandwidth information provider 600 may generate new traffic (e.g., a separate packet), that includes bandwidth information, and provide the new traffic to content provider 310 (and/or to another device).

As shown, packet 1105 may include an IP header 1110, as well as payload 1115. IP header 1110 may include, among other information, information identifying a source and/or a destination of packet 1105 (e.g., an IP address of user device 305, from which packet 1105 was received, and an IP address of content provider 310, for which packet 1105 is intended). Payload 1115 may include, for example, a request for content, and/or other information.

As shown, modified packet 1120 (e.g., as modified at 1015) may include the same IP header 1110 and payload 1115, as well as bandwidth information header 1125. Bandwidth information header 1125 may include, for example, information added to packet 1120 by traffic modification module 615. While shown in FIG. 11 as a header in addition to header 1110, in other implementations, IP header 1110 and/or payload 1115 may be modified to include the bandwidth information.

Returning to FIG. 10, process 1000 may additionally include outputting (at 1020) the modified traffic. For example, as described above with respect to traffic egress module 620, bandwidth information provider 600 may forward the modified traffic toward an intended destination of the traffic, such as content provider 310. Content provider 310 may receive the modified traffic, extract the bandwidth information from the modified traffic (e.g., from the header information), and may use the bandwidth information to select a content template.

Figure 12:
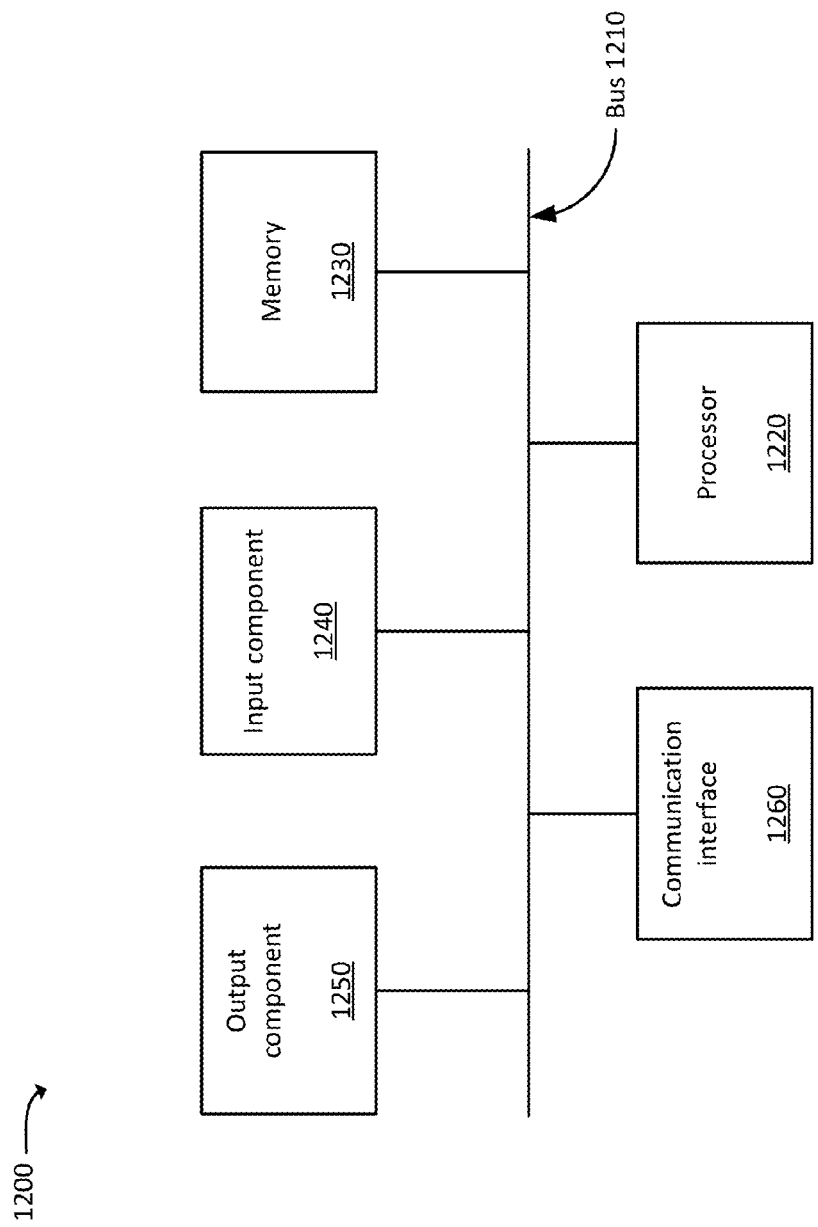
FIG. 12 illustrates example components of one or more devices, according to one or more implementations described herein.

FIG. 12 is a diagram of example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 7, 9, and 10, the order of the blocks may be modified in other implementations. Further, non-dependent blocks may be performed in parallel.

Additionally, while an example data structure is illustrated in FIG. 4 as including certain types of information, in practice, these data structures may store additional, fewer, different, or differently arranged types of information than shown in these figures. Furthermore, while these data structures are shown as tables, in practice, these data structures may take the form of any other type of data structure, such as an array, a linked list, a hash table, a tree, and/or any other type of data structure.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method, comprising:
  storing, by one or more server devices, a plurality of versions of a particular item of content, each version being associated with a different content template, of a plurality of content templates,
    wherein each content template, of the plurality of content templates, is associated with a different range of bandwidths,
    wherein each content template, of the plurality of content templates, corresponds to a different resolution, compression technique, or encoding technique associated with the particular item of content;
  receiving, by the one or more server devices, a request for the particular item of content, the request having been originally generated by a user device and subsequently modified by an intermediate device, prior to having been received by the one or more server devices, to include bandwidth information regarding the user device;
  identifying, by the one or more server devices, the bandwidth information regarding the user device included in the modified request,
    the bandwidth information including information regarding a level of service to which a subscriber, associated with the user device, has subscribed;
  selecting, by the one or more server devices, a particular content template, of the plurality of content templates, the selecting being performed based on the received bandwidth information,
    the selecting further including determining, based on the bandwidth information, that a bandwidth associated with the user device falls within the bandwidth range, associated with the particular content template; and
  outputting, by the one or more server devices and to the user device, the particular version of the particular item of content that is associated with the selected content template.

2. The method of claim 1, wherein the request for the particular item of content includes a resource identifier associated with the particular item of content.

3. The method of claim 1, wherein receiving the bandwidth information regarding the user device includes receiving the bandwidth information as header information in a data packet that includes the request for the particular item of content.

4. The method of claim 1, wherein outputting different versions of the particular item of content, according to different content templates, of the plurality of content templates, consumes different amounts of bandwidth.

5. The method of claim 1, wherein the bandwidth information includes information identifying at least one of:
  a maximum bandwidth to which the subscriber has subscribed, or
  a minimum bandwidth to which the subscriber has subscribed,
  wherein the selecting, performed based on the received bandwidth information, is performed further based on the maximum bandwidth or the minimum bandwidth.

6. The method of claim 1, wherein the bandwidth information includes additional bandwidth information, in addition to the information that is based on the level of service to which the subscriber has subscribed,
  wherein the selecting, performed based on the received bandwidth information, is performed further based on the additional bandwidth information.

7. The method of claim 1, wherein the bandwidth information includes information that indicates an actual measured bandwidth associated with the user device,
  wherein the selecting, performed based on the received bandwidth information, is performed further based on the actual measured bandwidth.

8. A system, comprising:
  a memory device storing:
    a plurality of versions of a particular item of content, each version being associated with a different content template, of a plurality of content templates,
      wherein each content template, of the plurality of content templates, is associated with a different range of bandwidths,
      wherein each content template, of the plurality of content templates, corresponds to a different resolution, compression technique, or encoding technique associated with the particular item of content;
    a set of processor-executable instructions; and
  a processor configured to execute the processor-executable instructions, wherein executing the computer-executable instructions causes the processor to:
    select a particular content template, of the plurality of content templates, the selecting being performed based on:
      a received request for the particular item of content, the request having originated at a user device and further having been modified by a server device to include bandwidth information regarding the user device,
      the bandwidth information regarding the user device, included in the request, the bandwidth information including information regarding a level of service to which a subscriber, associated with the user device, has subscribed, and
      a determination, based on the bandwidth information, that a bandwidth associated with the user device falls within the bandwidth range, associated with the particular content template; and
    output the particular version of the particular item of content that is associated with the selected content template.

9. The system of claim 8, wherein the request for the particular item of content includes a resource identifier associated with the particular item of content.

10. The system of claim 8, wherein outputting different versions of the particular item of content, according to different content templates, of the plurality of content templates, consumes different amounts of bandwidth.

11. The system of claim 8, wherein the level of service to which the subscriber has subscribed includes information identifying at least one of:
  a maximum bandwidth to which the subscriber has subscribed, or
  a minimum bandwidth to which the subscriber has subscribed,
  wherein the selecting is performed further based on the maximum bandwidth or the minimum bandwidth.

12. The system of claim 8, wherein the processor is further configured to receive bandwidth information in addition to the level of service to which the subscriber has subscribed,
  wherein the selecting is performed further based on the additional bandwidth information.

13. The system of claim 12, wherein the additional bandwidth information includes information that indicates an actual measured bandwidth associated with the user device.

14. A non-transitory computer-readable medium storing processor-executable instructions, which, when executed by one or more processors of one or more server devices, cause the one or more server devices to:
- store a plurality of versions of a particular item of content,
  - each version being associated with a different content template, of a plurality of content templates,
  - wherein each content template, of the plurality of content templates, is associated with a different range of bandwidths,
  - wherein each content template, of the plurality of content templates, corresponds to a different resolution, compression technique, or encoding technique associated with the particular item of content;
- receive a request for the particular item of content, the request having been originally generated by a user device and subsequently modified by an intermediate device, prior to having been received by the one or more server devices, to include bandwidth information regarding the user device;
- identify the bandwidth information regarding the user device included in the modified request,
  - the bandwidth information including information regarding a level of service to which a subscriber, associated with the user device, has subscribed;
- select a particular content template, of the plurality of content templates, the selecting being performed based on the received bandwidth information,
- the selecting further including determining, based on the bandwidth information, that a bandwidth associated with the user device falls within the bandwidth range, associated with the particular content template; and
- output, to the user device, the particular version of the particular item of content that is associated with the selected content template.

15. The non-transitory computer-readable medium of claim 14, wherein the request for the particular item of content includes a resource identifier associated with the particular item of content.

16. The non-transitory computer-readable medium of claim 14, wherein receiving the bandwidth information regarding the user device includes receiving the bandwidth information as header information in a data packet that includes the request for the particular item of content.

17. The non-transitory computer-readable medium of claim 14, wherein outputting different versions of the particular item of content, according to different content templates, of the plurality of content templates, consumes different amounts of bandwidth.

18. The non-transitory computer-readable medium of claim 14, wherein the bandwidth information includes information identifying at least one of:
- a maximum bandwidth to which the subscriber has subscribed, or
- a minimum bandwidth to which the subscriber has subscribed,
- wherein the selecting, performed based on the received bandwidth information, is performed further based on the maximum bandwidth or the minimum bandwidth.

19. The non-transitory computer-readable medium of claim 14, wherein the bandwidth information includes additional bandwidth information, in addition to the information that is based on the level of service to which the subscriber has subscribed,
- wherein the selecting, performed based on the received bandwidth information, is performed further based on the additional bandwidth information.

20. The non-transitory computer-readable medium of claim 14, wherein the bandwidth information includes information that indicates an actual measured bandwidth associated with the user device,
- wherein the selecting, performed based on the received bandwidth information, is performed further based on the actual measured bandwidth.

* * * * *